United States Patent [19]
Espenshade et al.

[11] Patent Number: 5,860,695
[45] Date of Patent: Jan. 19, 1999

[54] REMOVABLE SEAT WITH HEIGHT ADJUSTMENT

[75] Inventors: Gregg R. Espenshade, Bowmansville; Kristopher Konawalik, Birdsboro, both of Pa.

[73] Assignee: Graco Children's Products Inc., Elverson, Pa.

[21] Appl. No.: 738,170

[22] Filed: Oct. 25, 1996

[51] Int. Cl.$^6$ .................................................. A47C 13/00
[52] U.S. Cl. ................. 297/130; 297/256.16; 297/250.1; 297/354.12; 297/354.13; 297/440.1
[58] Field of Search .............................. 297/130, 256.16, 297/440.1, 250.1, 256.17, 354.13, 354.12; 280/647

[56] References Cited

U.S. PATENT DOCUMENTS

| | | | |
|---|---|---|---|
| 2,101,290 | 12/1937 | Pierson | 297/130 |
| 2,435,733 | 2/1948 | Belyeu | 297/130 X |
| 2,805,076 | 9/1957 | Thomas | 297/130 X |
| 2,984,291 | 5/1961 | Kostenborder et al. | 297/130 |
| 4,440,331 | 4/1984 | Schimmels | 297/130 X |
| 4,447,087 | 5/1984 | Massonnet | 297/130 |
| 4,786,064 | 11/1988 | Baghdasarian | 297/130 X |
| 4,874,182 | 10/1989 | Clark | 297/130 X |

FOREIGN PATENT DOCUMENTS

| | | | |
|---|---|---|---|
| 190962 | 8/1937 | Switzerland | 297/130 |
| 1593982 | 7/1981 | United Kingdom | 297/130 |

*Primary Examiner*—Laurie K. Cranmer
*Assistant Examiner*—Rodney B. White
*Attorney, Agent, or Firm*—Richard B. O'Planick

[57] ABSTRACT

A child carrier with an improved mounting system is disclosed. The improved mounting arrangement includes at least one side wall having at least one slot on a surface of the side wall. The arrangement also includes at least one support extension connected to a frame and adapted to engage the slot and cooperate with a stop to fixedly connect the child carrying device to the frame.

12 Claims, 9 Drawing Sheets

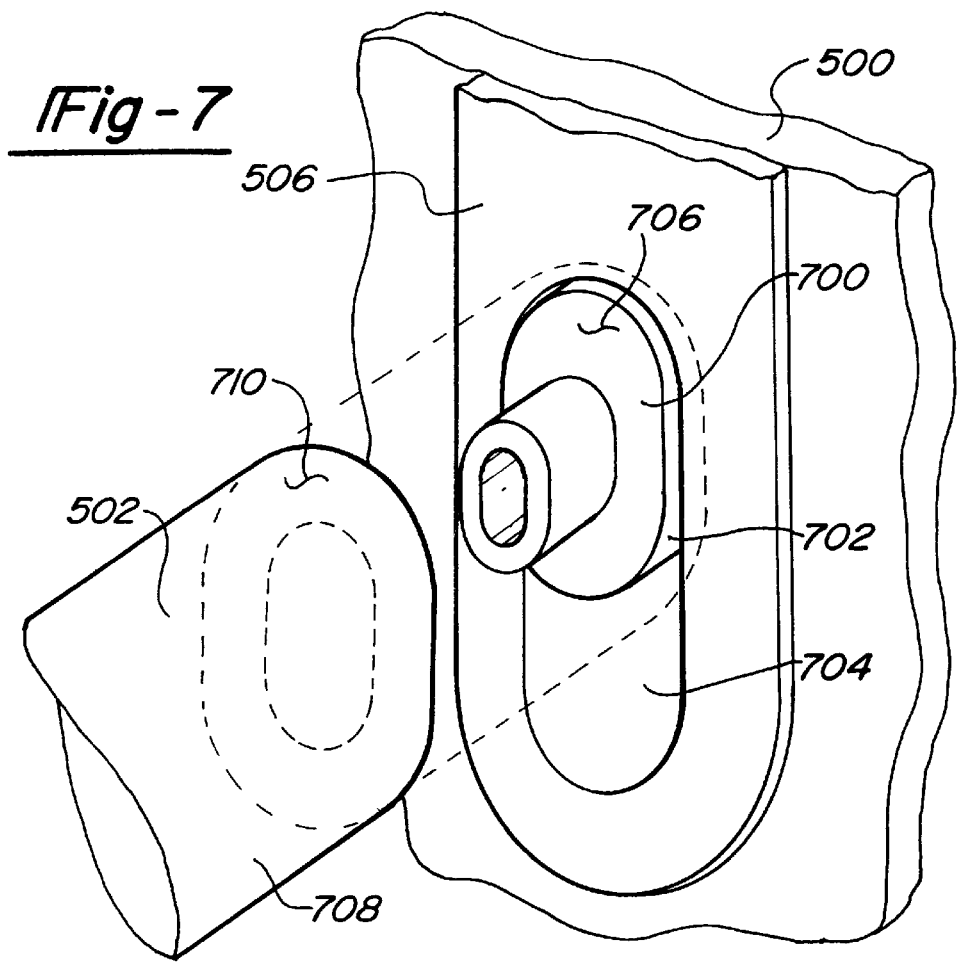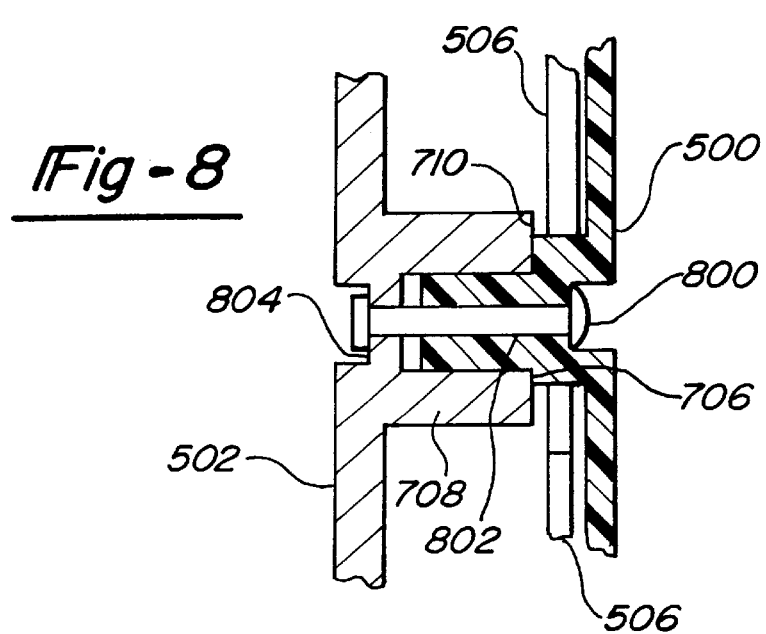

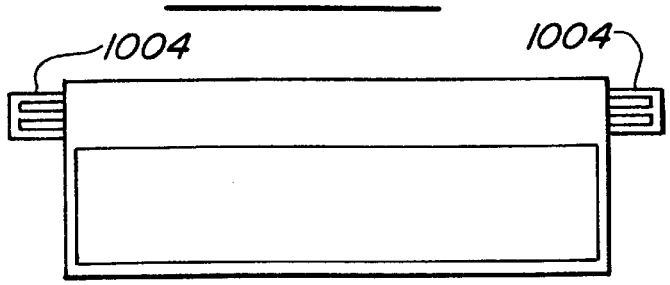
Fig-10A
Fig-10B
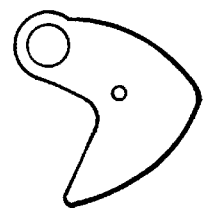
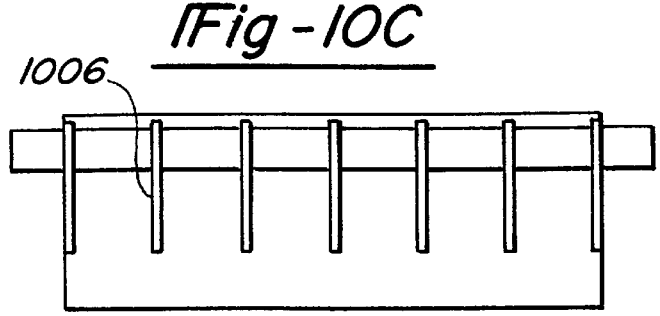
Fig-10C
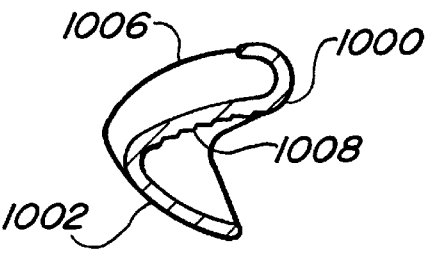
Fig-10D
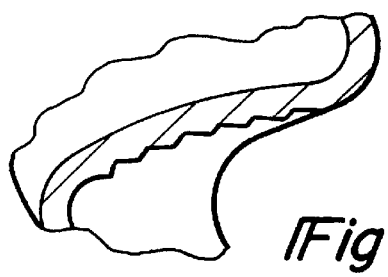
Fig-10E
Fig-10F

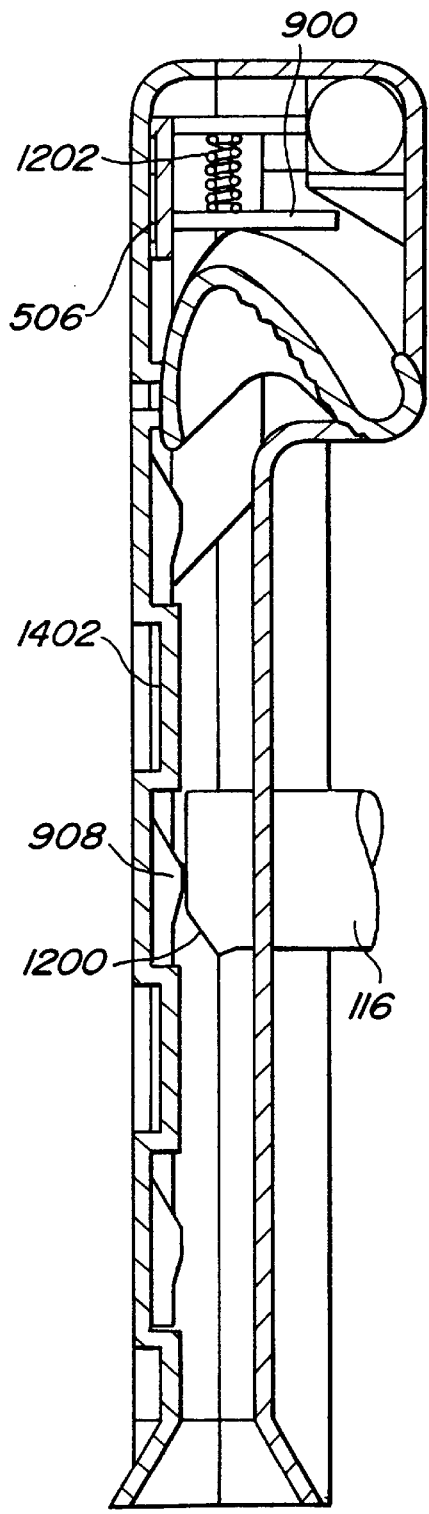
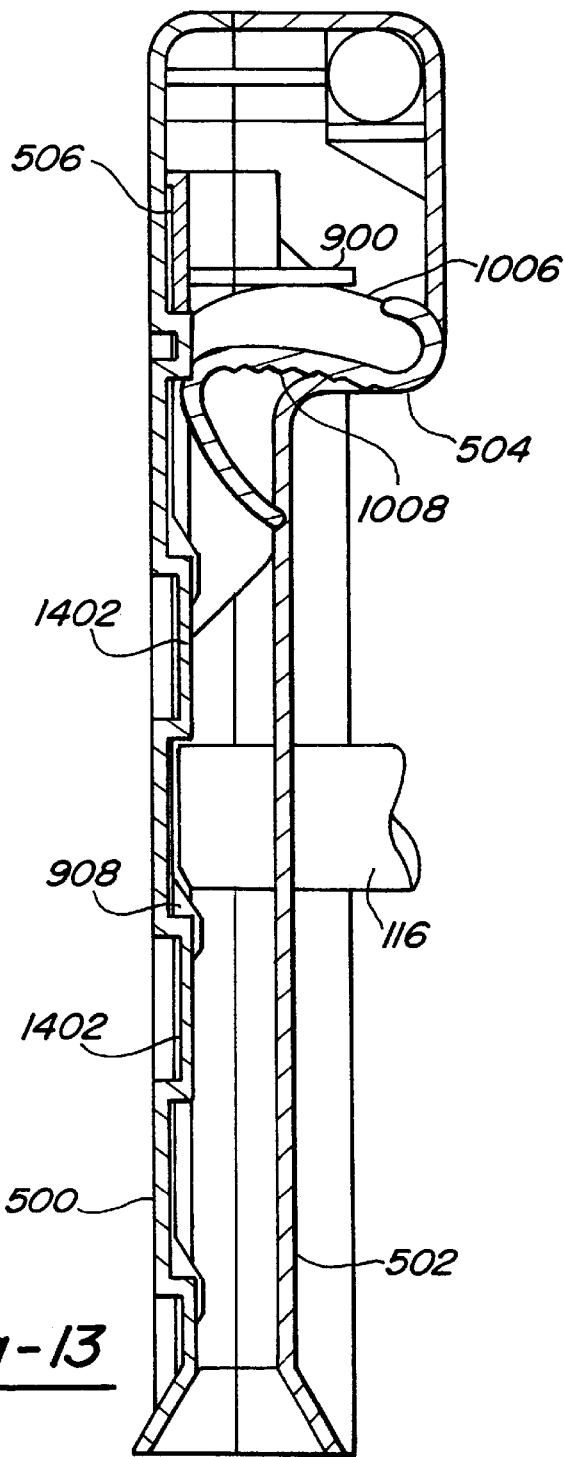
Fig-12
Fig-13

REMOVABLE SEAT WITH HEIGHT ADJUSTMENT

BACKGROUND OF THE INVENTION

1. Field of the Invention

This invention relates to a child carrier. This child carrier is adaptable and can be mounted on a suitable frame. Specifically, the child carrier is adapted to be mounted to a stroller or baby buggy. The child carrier can be used alone, or if the adult wishes, to carry the child by hand.

2. Discussion of the Related Art

Conventional child carriers and systems to attach child carriers to frames consisted of wires and latches. Two transverse wires extended across the bottom of the child carrier. Two receptacle wires, attached to the frame and open on top, would receive each of the wires on the bottom of the child carrier. Once the child carrier was positioned on the receptacle, the user would then have to latch all of the receptacles closed with a cover that would extend across the open portion and secure the child carrier to the frame.

The device had several disadvantages. First, the child carrier was prone to tilting and could spill children who were unattended and whose carriers were improperly latched down to the frame. The carrier would rotate about one of the wires and spill the child out of the carrier. This situation could only be prevented if all of the latches of all of the receptacles were securely closed.

Closing all of the latches was time consuming and inconvenient because the operator would have to walk around the carrier and close four latches. Also, operators would sometimes forget to latch the carrier to the frame.

SUMMARY OF THE INVENTION

Accordingly, an object of the present invention is directed to a seat mount and height adjustment assembly that substantially obviates one or more of the problems due to limitations and disadvantages of the related art.

Another object of the present invention is to provide a system for connecting a child carrier to a frame that automatically locks in place without requiring any latching by the user.

Another object of the present invention is to provide a system for connecting a child carrier to a frame that prevents tilting of the carrier and prevents spilling children out of the carrier.

Another object of the present invention is to provide a system for connecting a child carrier to a frame that allows convenient height adjustment.

Another object of the present invention is to provide a system for connecting a child carrier to a frame that is easy to install and easy to remove from the frame.

Another object of the present invention is to provide nearly automatic installation and removal.

Another object of the present invention is to provide a single action connection system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the child carrying device includes a bottom portion and a plurality of side walls, a first side wall having a slot on a surface thereof; and a support extension connected to the frame and adapted to engage the slot to fixedly connect the child carrying device to the frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 6 is a cross-sectional schematic view a foot rest rivet;

FIG. 7 is an exploded isometric view of one of the mounting boss systems;

FIG. 8 is a cross-sectional schematic view one of the mounting boss systems;

FIG. 10*a* is a front view an actuator;

FIG. 10*b* is a side view an actuator;

FIG. 10*c* is a back view an actuator;

FIG. 10*d* is a cross-sectional schematic view of an actuator;

FIG. 10*e* is a detailed view of the handle surface of an actuator;

FIG. 10*f* is a detailed view of the extension of an actuator;

FIG. 12 is a cross-sectional schematic view the device when actuated;

FIG. 13 is a cross-sectional schematic view the device at rest; and

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The invention will now be further clarified by the following example, which are intended to be purely exemplary of the invention.

Figure 1:
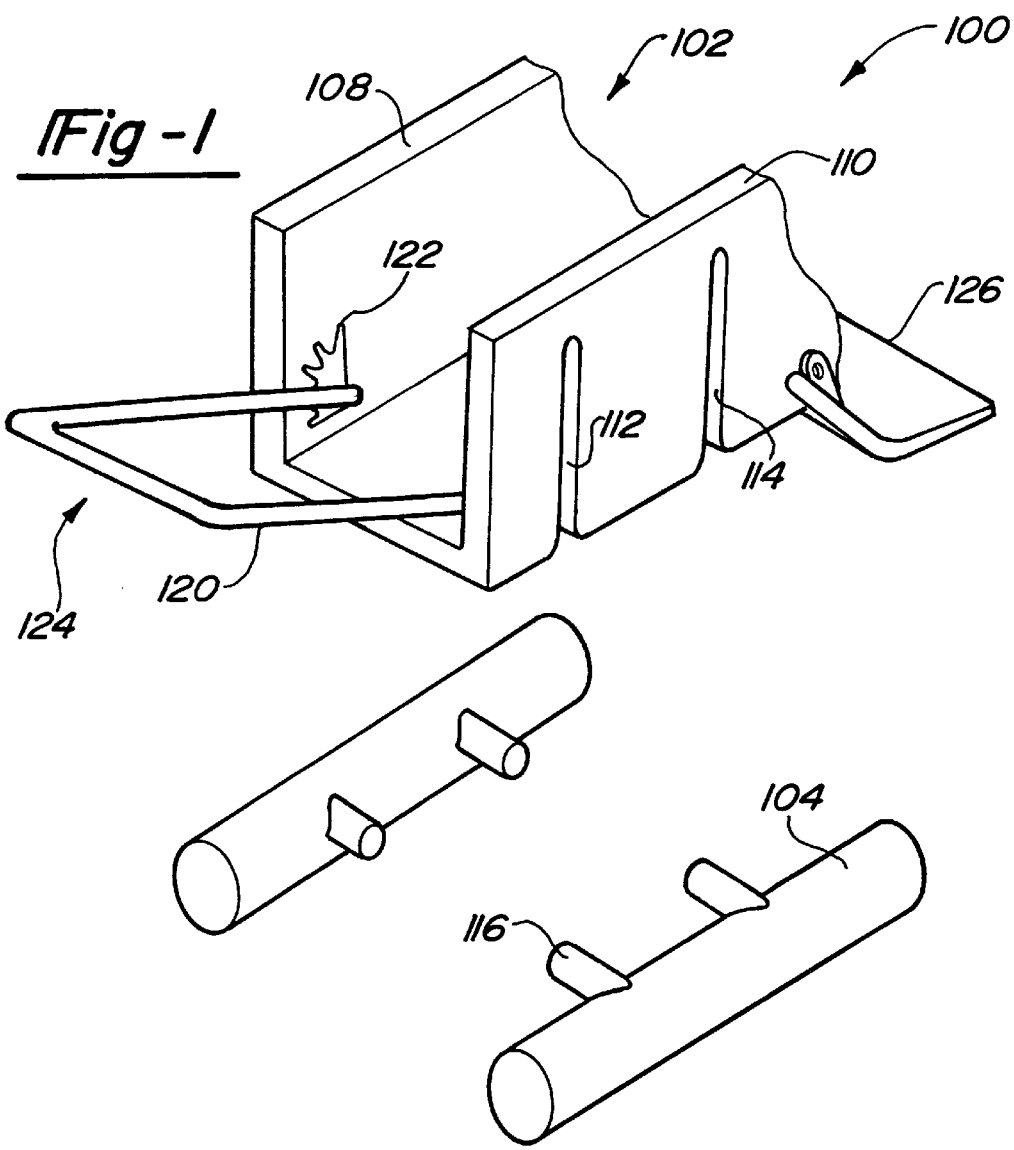
FIG. 1 is an exploded view of a child carrier and its associated frame.
Figure 2:
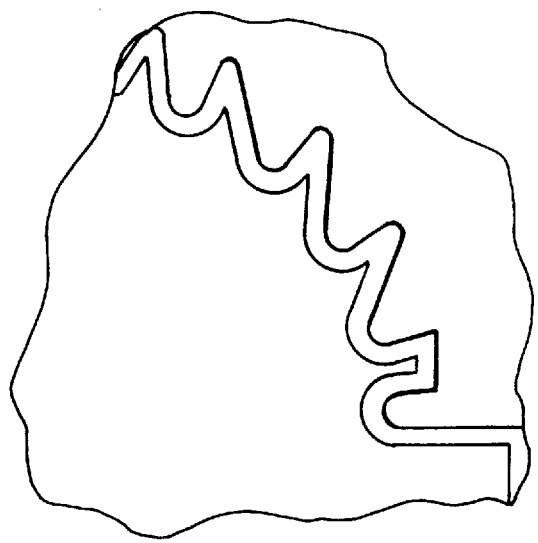
FIG. 2 is a detailed view of a rooster tail.

The invention includes a child carrier and an associated frame. A slot on the child carrier connects the child carrier to the frame. In the preferred embodiment, the system 100 generally is shown in FIG. 1. A child carrier 102 has an adjustable back rest 124 (for clarity, only the back rest frame 120 is shown) which can move from an upright position to an inclined position by the use of a rooster tail 122. The back rest frame 120 can slide radially outward to disengage a pin (not shown) into and out of the slots of the rooster tail 122. The back rest frame is a two piece, spring loaded assembly that allows the pin to move axially along the longitudinal length of the back rest frame 120. The rooster tail is shown in greater detail in FIG. 2.

The side walls also include an arm bar button (not shown). This button is used to hold an arm bar securely in several distinct positions. This arm bar and button is identical to the arm bar disclosed in U.S. patent application, Ser. No. 08/556,056, filed Nov. 9, 1995, which is incorporated herein by reference.

The child carrier 102 is connected to a frame 104 by the use of slots. In the preferred embodiment, two opposite side walls 108 and 110 have two slots 112 and 114 (on side wall 110, not shown on side wall 108) each, resulting in four total slots. The frame 104 has a set of protrusions 116 which correspond to the number of slots disposed on the child carrier 102.

Figure 3:
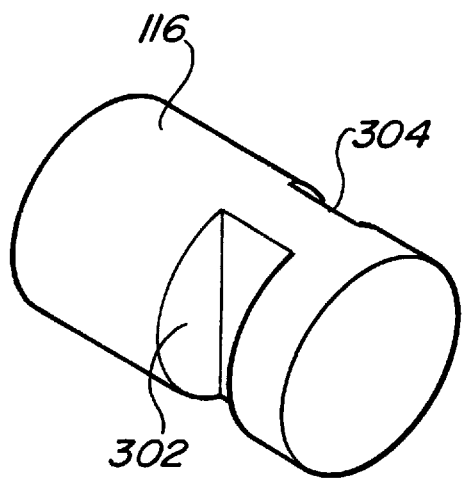
FIG. 3 is an isometric view of a protrusion.
Figure 4:
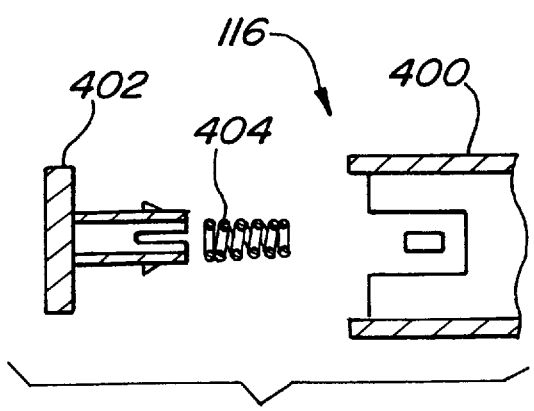
FIG. 4 is a cross-sectional schematic view a button.

The preferred invention also includes protrusions with guides, as shown in FIG. 3. As the protrusions 116 enter the slots 112 and 114 (see FIG. 1), grooves 302 and 304 cut into the protrusions 116 help to guide the child carrier 102 properly into position with respect to the frame 104 (see FIG. 1). This arrangement stabilizes the system 100, and prevents tilting and tipping of the child carrier 102 even if the carrier is improperly installed onto the frame.

The invention also includes provisions for positively securing a child carrier to a frame. The simplest method of securing the child carrier 102 to the frame 104 is to allow the carrier 102 to drop onto protrusions 116 until the top of slots 112 and 114 rest on the protrusions 116. Used in this configuration, the top of the slots 112 and 114 act as stops. While this is adequate, the preferred embodiment allows more secure attachment and also allows height adjustment.

To accomplish a more secure attachment, the preferred embodiment includes, a button housing 400 attached to the frame which receives a button 402. The button 402 and the button housing 400 cooperate to receive a compression spring 404 which biases the button 402 away from the button housing 400. The button 402 cooperates with a mechanism discussed below to provide positive securement and height adjustment.

Figure 5:
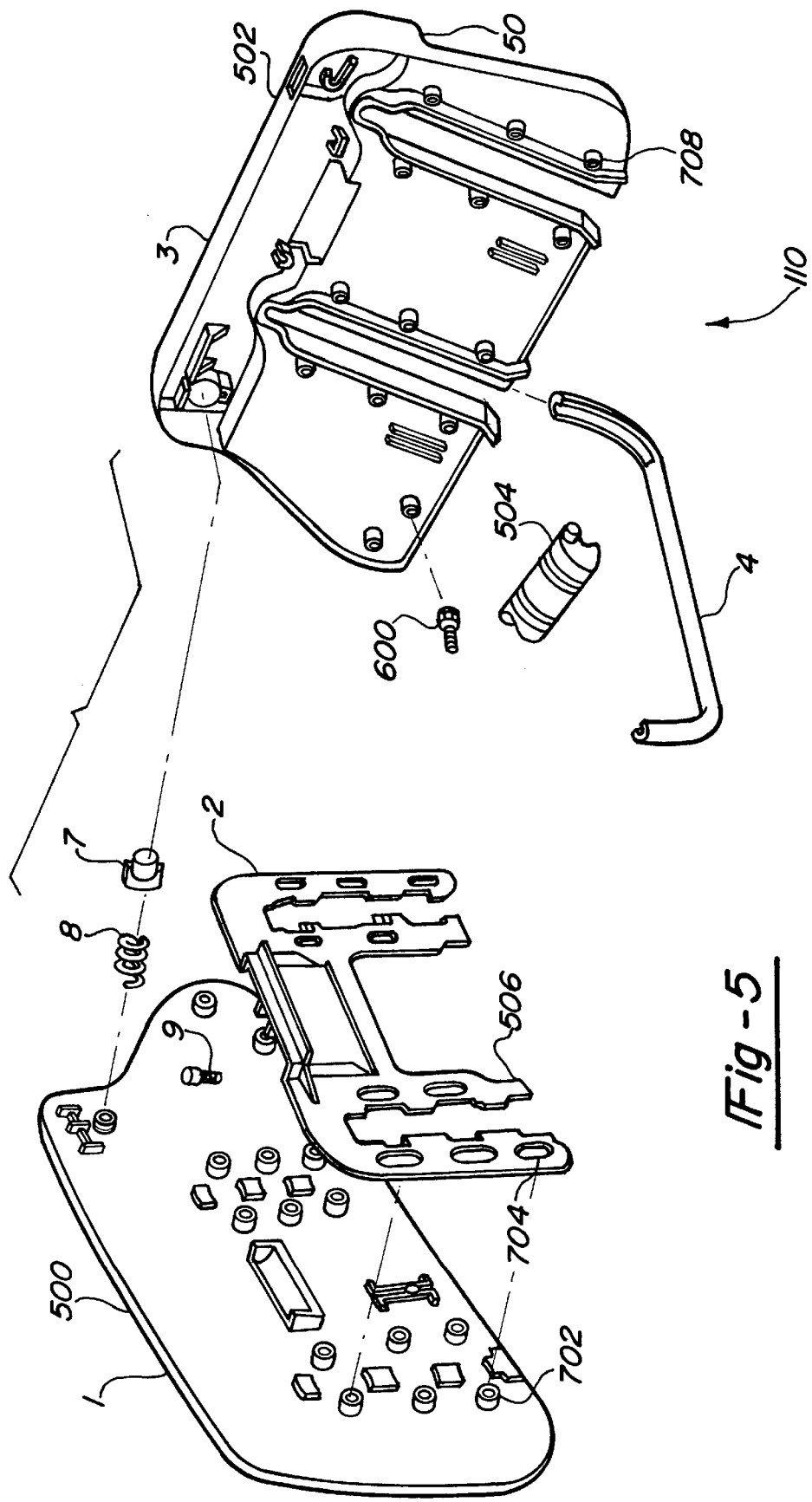
FIG. 5 is an exploded view of one of the side walls.

Details of the preferred side wall can be seen in FIG. 5, which shows the internal components of the side walls 108 and 110. Although FIG. 5 shows only one of the side walls 110, it will be appreciated that our preferred embodiment includes two such side walls 108 and 110 mounted on either side of the child carrier 102. The side wall 110, shown in FIG. 5, is made of an inner casing 500 and an outer casing 502. Between these two casings is a mechanism which allows removal and height adjustment of the child carrier 102. The mechanism includes an actuator 504 and a button release member 506.

The foot rest 126 is mounted to the side walls 108 and 110 by two rivets, one rivet each of the side walls 108 and 110. To avoid redundancy, only one rivet 600 mounted on side wall 110 is discussed. FIG. 6 shows the mounting details of this rivet 600. The rivet head 602 is sandwiched between two circular extensions. As shown in FIG. 6, the rivet 600 fits inside the smaller circular extension 604 on the inner casing 500 and that extension 604 fits inside the larger circular extension 606 on the outer casing 502, thus securing the rivet 600 to the side wall 110. The foot rest 126 (see FIG. 1) is mounted to this rivet and the corresponding rivet (not shown) on the other side wall 108.

FIG. 5 shows the general relationships between the inner casing 500, the button release member 506, and the outer casing 502. The button release member 506 is located adjacent to the inner casing 500 and slides against the inner casing 500. The button release member 506 is held in place between the inner casing 500 and the outer casing 502 by a series of stand off bosses 702 and 708 and an aperture 704 on the button release member 506.

Figure 9A:
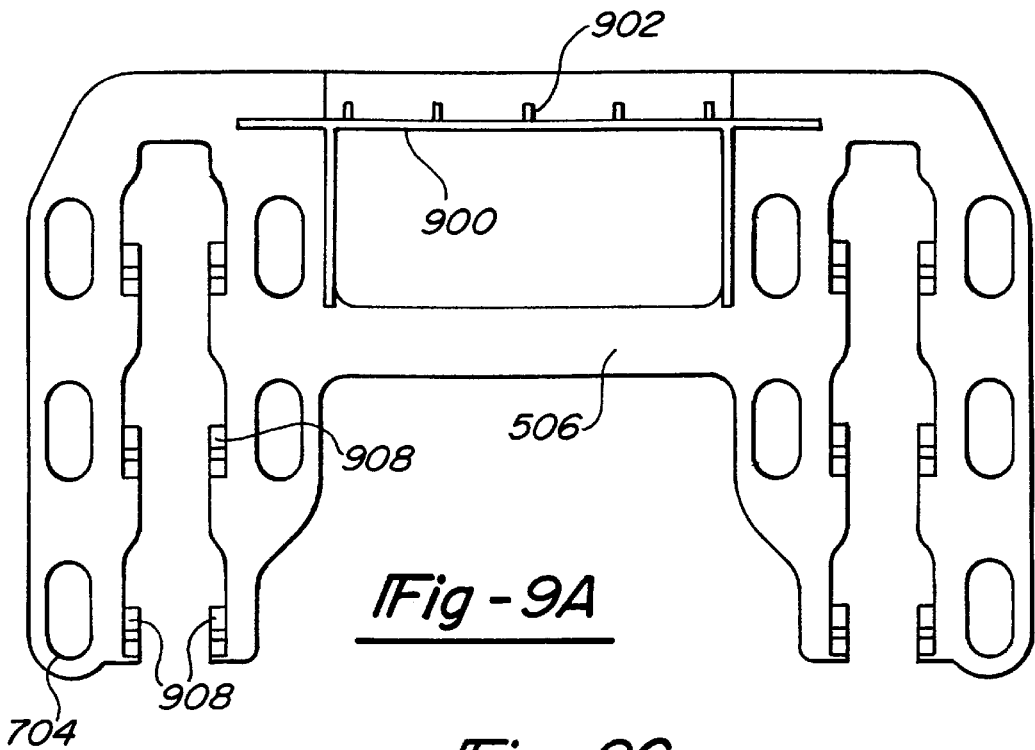
FIG. 9*a* is a front view a button release member.

FIG. 7 shows the details of the interface between the three members. The inner casing has a stepped male boss 700. The lower portion 702 of the stepped male boss 700 cooperates with an aperture 704 on the button release member 506. The aperture 704 is shaped in a way that allows the button release member to slide in only one direction. The lower portion 702 of the stepped male boss 700 has a front face 706 which engages a female boss 708 extending from the outer member 502. Female boss 708 also has a front face 710 which keeps the button release member 506 securely in place against the inner casing 500. As is shown in FIG. 8, this joint allows the button release member 506 to slide adjacent to the inner casing 500, while at the same time, insuring that the button release member 506 remains adjacent to the inner casing 500. A rivet 800 extends through an aperture 802 on the stepped male boss 700 and a corresponding aperture 804 on the female boss 708 to secure the inner casing 500 to the outer casing 502. In the preferred embodiment, there are ten such boss and aperture arrangements that correspond to the ten apertures found on button release member 506 (see FIG. 9a).

The actuator 504 is shown in greater detail in FIGS. 10a–10f. The actuator has a stationary end 1000 and a pivoting end 1002. The actuator 504 is mounted to the outer casing 502. The actuator 504 is mounted to the outer casing 502 on an upper ridge 508 (see FIG. 5). The actuator 504 is mounted in a manner which allows the actuator 504 to be used both as a handle to lift the entire child carrier, and as a rotating actuator (discussed below). The actuator 504 is held in place vertically by pocket 1100 defined by a straight portion 1102 of the ridge 508 which is adjacent to an aperture 1104 below, and by a pair of reinforced ribs 1104 above. The two extensions 1004 on the actuator 504 fit into this pocket 1100. Horizontally, the actuator 504 is held in place by the inner casing 500 and by the outer casing 502. See FIG. 13. The inner wall also has a rib 1400 which assists in locating the actuator 504 horizontally.

FIGS. 12 and 13 show the operation of the device. The actuator actuates the button release member by converting rotational motion to linear motion. FIG. 13 shows the rest, or engaged position of the system and FIG. 12 shows the active or disengaged position of the system.

Figure 9C:
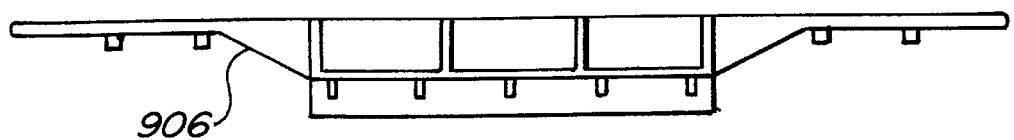
FIG. 9*c* is a top view a button release member.
Figure 9B:
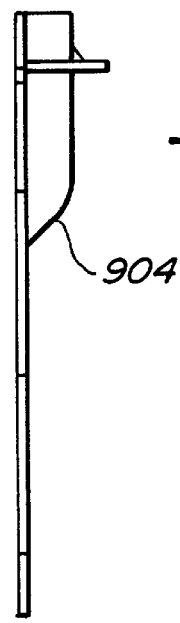
FIG. 9*b* is a side view a button release member.
Figure 11:
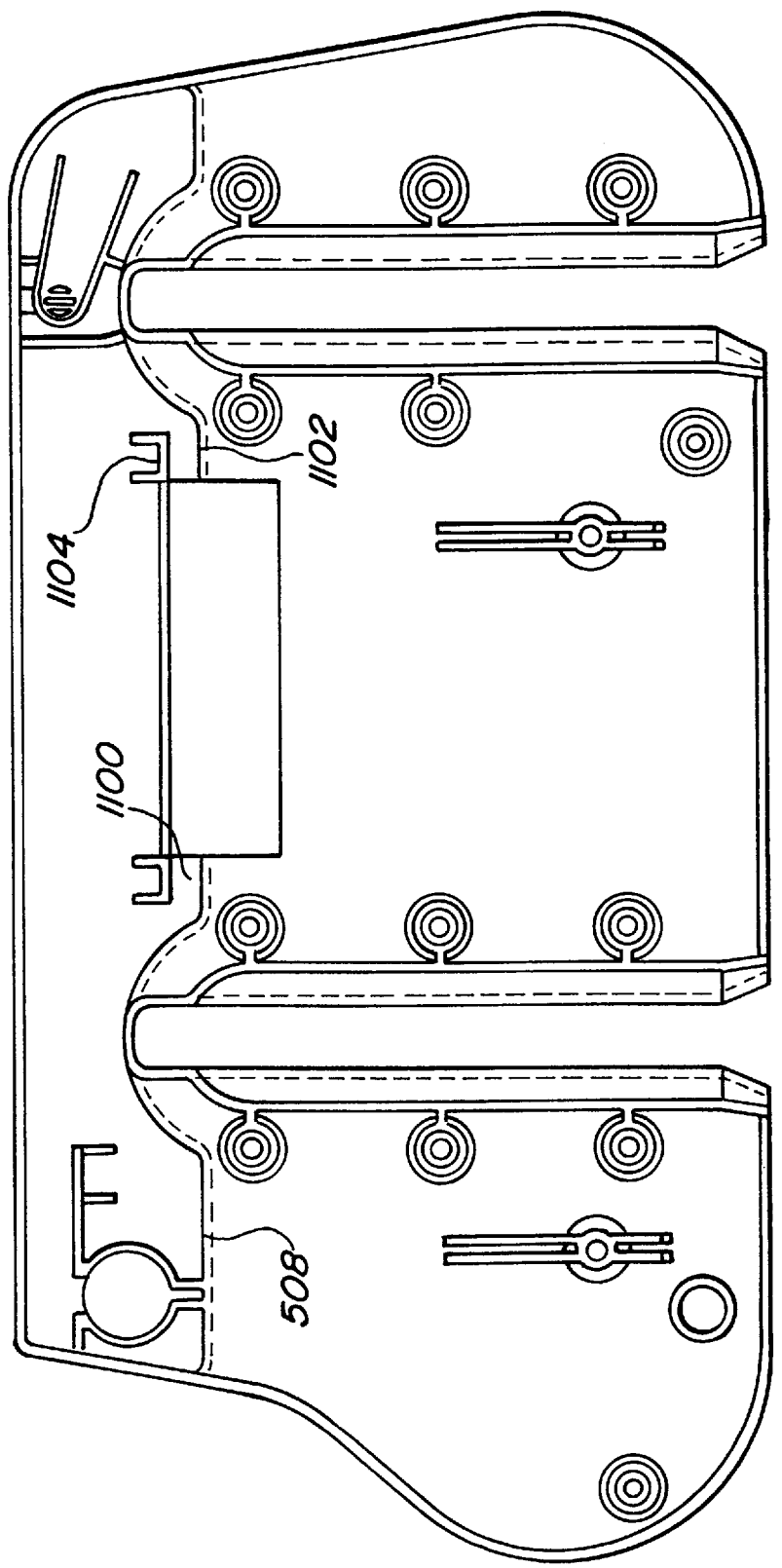
FIG. 11 is a top view of an outer casing.
Figure 14:
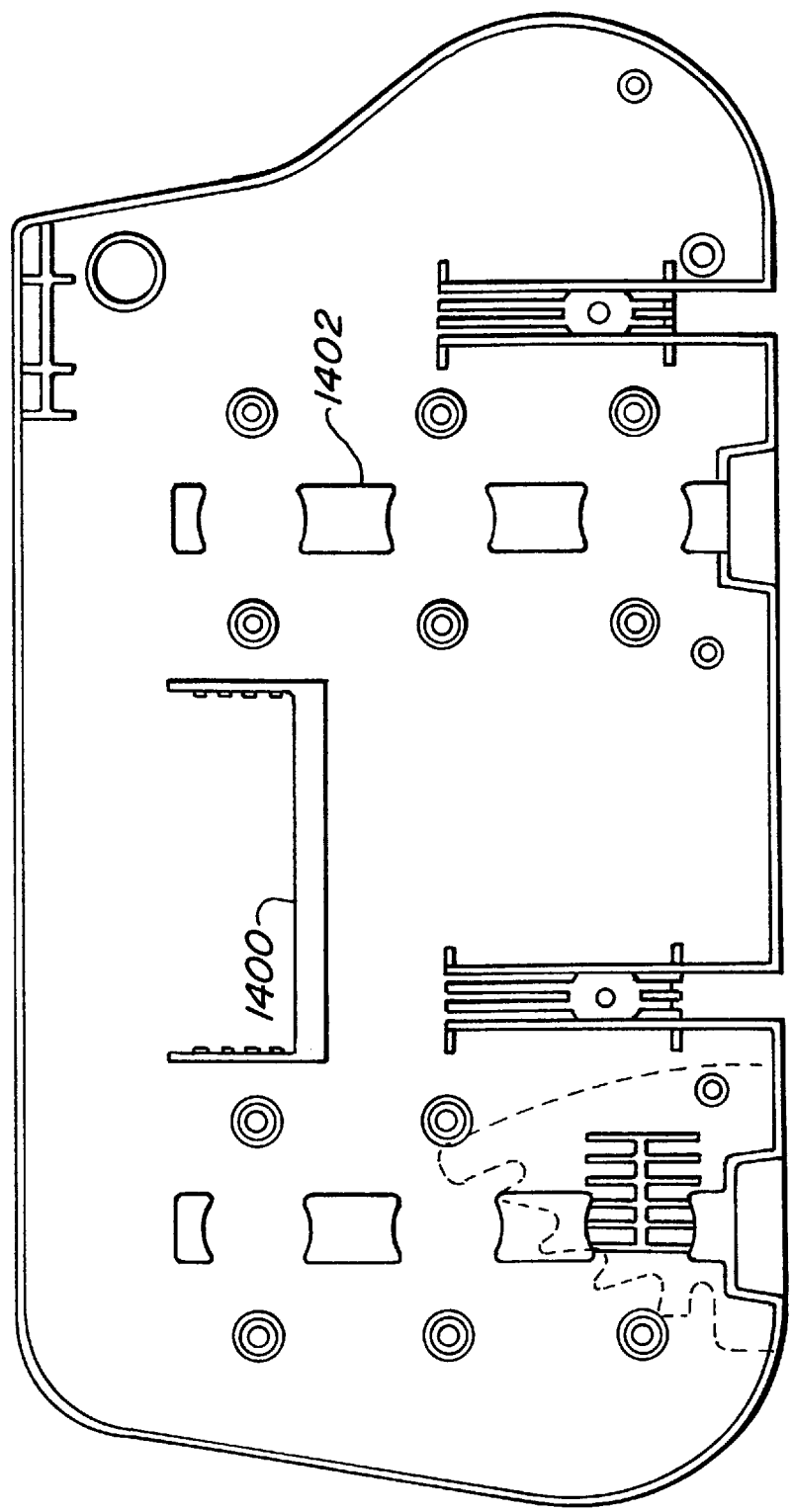
FIG. 14 is a top view of an inner casing.

The upper portion of the button release member 506 has a follower flange 900. This follower flange 900 has reinforcing flanges 902 and side braces 904. The side braces also have gusset flanges 906. See FIGS. 9a–9c. These flanges provide additional strength and rigidity to the assembly. The follower flange 900 extends towards the outer casing.

Returning to FIG. 13, the actuator 504 has a cam surface 1006 which is on the opposite side as the handle 1008 surface. Preferably, the cam surface 1006 is created by a series of ribs (see FIG. 10c). This helps to reduce friction. As is apparent from FIG. 13, the cam surface 1006 is adjacent to the follower flange 900. In this rest position, the buttons 116 mounted on the frame 104 are engaged to engagement ribs 1402 found on the inner casing 500. These engagement ribs 1402 rest on the buttons 116 and support the weight of the child carrier. The buttons 116, when engaged to the engagement ribs 1402 form a stop.

The cam surface 1006 on the actuator 504 in cooperation with the follower flange 900 on the button release member 506 are designed so that progressive rotation of the actuator 504 pushes the follower flange 900 on the button release member 506 upwards. See FIG. 12. Ramps 908 on the button release member 506 depress the buttons 116 in (i.e., towards the frame and away from the inner casing). As the buttons 116 are pressed in, the buttons 116 disengage with the engagement ribs 1402 (see FIG. 12). When the buttons disengage fully (i.e., when the outer face of the button has cleared the outer face of the engagement rib) the side wall is free to slide in relation to the frame (see FIG. 12).

The ramps 908 found on the button release plate 506 can be moved to any desired location with respect to the buttons 116. But the preferred embodiment has two ramps (see FIG. 9a) which engage each button 116, and the ramps 908 engage the button 116 at both horizontal ends of the button 116. Ramps 1200 could also be placed on the buttons (see FIG. 12), and the ramps 908 on the button release member 506 could be converted to bumps or any other protrusion. The preferred embodiment contemplates that both the button release member 506 and the buttons have ramps 1200.

The buttons 116 are engaged by simply pivoting the actuator 504 back to the position shown in FIG. 13. When this occurs, the button release member 506 moves vertically downward by the force of gravity. The preferred embodiment, however, contemplates the use of a return compression spring 1202 (see FIG. 12).

The system allows very convenient mounting and removal the child carrier. The user simply lifts the child carrier 102 by using the handle portion 1008 of the actuator 504. The natural tendency is to rotate the actuator 504 which releases the child carrier 102 from the frame buttons, as discussed above. Installation of the child carrier is also safe and convenient. The user lowers the child carrier by the handle portion and rotates the actuator to the locking or rest position (see FIG. 13) to securely attach the child carrier to the frame. So both operations of installing and removing the child carrier are single action (i.e., installation and removal are both performed in a single step) and practically automatic.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for a child carrying device comprising:
    a frame;
    a child carrying device including a bottom portion and a first wall and a second side wall disposed on said bottom portion, each side wall having a plurality of slots, each of said slots having a length; and
    a support extension connected to the frame, said support extension in communication with each of said plurality of slots and demountably securable to each side wall such that said child carrying device is adjustably connected to the frame substantially along the length of each of said slots.

2. The system according to claim 1, further comprising a first stop at a first vertical location and a second stop at a second vertical location, the first vertical location differing from the second vertical location.

3. The system according to claim 1, wherein each slot of said plurality of slots includes an opening perpendicular to the bottom portion of the child carrying device.

4. The system according to claim 1, wherein the first and second side walls being opposite to one another.

5. The system according to claim 1, wherein each side wall includes a first member and a second member; and wherein the support extension includes protrusions with a first position that engages a stop disposed on said first member of each side wall, said protrusions being receivable within said slot on said second member of each side wall.

6. The system according to claim 5, further comprising an actuator associated with each said side wall, said actuator being adapted to be actuated by a user of the system, the actuator further being adapted to move the protrusion from said first position to a second position such that in said second position said protrusion is disengaged from said stop.

7. The system according to claim 5, wherein each side wall of said plurality of side walls further includes a release member disposed between said first member and said second member.

8. The system according to claim 7, wherein each side wall further includes an actuator springably associated with each second member and slidably associated with said release member whereby said release member is moveable between a locked position and an unlocked position.

9. The system according to claim 4, wherein said stop is a plurality of engagement ribs vertically disposed on said first member of each side wall aligned along said slot on said second member of each side wall.

10. A system according to claim 4, wherein each said protrusion comprises:
    a button housing;
    a compression spring disposed within said housing;
    a button in communication with said compression spring such that said button is biased away from said button housing.

11. A system for a child carrying device comprising:
    a frame;
    a child carrying device including a bottom portion and a first side wall and second side wall disposed on said bottom portion each side wall having a plurality of slots, each side wall further including a first member and a second member; and
    a support extension connected to the frame, said support extension including a protrusion with a first position that engages a stop disposed on said first member of each side wall such that said child carrying device is adjustably connected to the frame along said slots.

12. A system for a child carrying device comprising:
    a frame;
    a child carrying device including a bottom portion and a first side wall and a second side wall disposed on said bottom portion, each side wall having a plurality of slots, each side wall further including a first member and a second member;
    a support extension connected to the frame, said support extension including a protrusion with a first position that engages a stop disposed on said first member of each side wall such that said child carrying device is adjustably connected to the frame along said slots; and
    an actuator associated with each said side wall, said actuator being adapted to be actuated by a user of the system, the actuator further being adapted to move the protrusion from said first position to a second position such that in said second position said protrusion is disengaged from said stop on said first member of each side wall.

* * * * *